(12) United States Patent
Sherrod et al.

(10) Patent No.: US 7,367,420 B1
(45) Date of Patent: May 6, 2008

(54) ALL TERRAIN VEHICLE (ATV) HAVING A RIDER INTERFACE FOR ELECTRONIC OR MECHANICAL SHIFTING

(75) Inventors: Sean Sherrod, Wyoming, MN (US); Matt Iandrup, Chanhassen, MN (US)

(73) Assignee: Polaris Industries Inc., Medina, MN (US)

( * ) Notice: Subject to any disclaimer, the term of this patent is extended or adjusted under 35 U.S.C. 154(b) by 476 days.

(21) Appl. No.: 11/010,736

(22) Filed: Dec. 13, 2004

(51) Int. Cl.
*B60K 17/00* (2006.01)

(52) U.S. Cl. ..................................... 180/336
(58) Field of Classification Search .............. 180/315, 180/332, 335, 336, 22, 210, 219; 74/473.12
See application file for complete search history.

(56) References Cited

U.S. PATENT DOCUMENTS

| | | | |
|---|---|---|---|
| 1,666,793 A | 4/1928 | Sanguineti | |
| 3,840,085 A | 10/1974 | Smith | |
| 3,856,123 A | 12/1974 | Kinsey | |
| 3,894,442 A | 7/1975 | Hembree | |
| 3,935,916 A * | 2/1976 | Ferraro | 180/219 |
| 4,132,296 A | 1/1979 | Evett | |
| 4,221,276 A | 9/1980 | Mitchell et al. | |
| 4,319,673 A | 3/1982 | Kojima | |
| 4,325,267 A | 4/1982 | Kojima | |
| 4,415,056 A | 11/1983 | Smith | |
| 4,580,652 A | 4/1986 | Turner et al. | |
| 4,619,154 A | 10/1986 | Yamanaka | |
| 5,012,692 A | 5/1991 | Nagano | |
| 5,036,939 A * | 8/1991 | Johnson et al. | 180/233 |
| 5,247,852 A * | 9/1993 | Guerr | 74/551.8 |
| 5,287,766 A | 2/1994 | Nagano | |
| 5,299,652 A | 4/1994 | Bevins | |
| 5,390,565 A | 2/1995 | Tagawa et al. | |
| 5,400,675 A | 3/1995 | Nagano | |
| 5,577,413 A | 11/1996 | Tagawa et al. | |
| 5,802,923 A | 9/1998 | Hara | |
| 6,149,540 A | 11/2000 | Johnson et al. | |
| 6,167,774 B1 | 1/2001 | Gagnon et al. | |
| 6,257,081 B1 | 7/2001 | Gagnon et al. | |
| 6,453,764 B1 | 9/2002 | Ose | |
| 6,695,090 B2 * | 2/2004 | McAllister | 180/333 |
| 7,174,984 B2 * | 2/2007 | Kosugi et al. | 180/219 |

* cited by examiner

*Primary Examiner*—Eric Culbreth
*Assistant Examiner*—Robert A. Coker
(74) *Attorney, Agent, or Firm*—Baker & Daniels LLP

(57) ABSTRACT

A rider interface for electronic or mechanical shifting of an ATV provided on the ATV handlebars. An up-shift mechanism is located on one side of the ATV and a down-shift mechanism is located remotely from the up-shift mechanism on an opposite side of the ATV. Preferably, the up-shift mechanism is in the form of a paddle lever and the down-shift mechanism is in the form of a trigger lever.

30 Claims, 6 Drawing Sheets

ALL TERRAIN VEHICLE (ATV) HAVING A RIDER INTERFACE FOR ELECTRONIC OR MECHANICAL SHIFTING

FIELD OF THE INVENTION

This invention relates to all terrain vehicles (ATVs) and, more particularly, to an ATV having an improved rider interface for electronic or mechanical shifting of the ATV's gears or continuously variable transmission (CVT) ratio.

BACKGROUND OF THE INVENTION

Most ATVs are equipped with either traditional, discrete mechanical gears (i.e. first, second, . . . fifth, neutral and reverse) or a CVT which may have a mode to simulate discrete gears by holding the transmission at fixed ratios. The method for shifting can be completely manual (i.e., manual clutch and shift lever), automated, (i.e., electric clutch and shift mechanism actuated by the rider with pushbuttons labeled as "shift up," "shift down"), or fully automatic (i.e., no rider input is required for shifting).

In ATVs that have automated rider selected shifting, the rider inputs for shifting can be a bit awkward to use correctly. The most common interface is in the form of an interface located on a handlebar of the vehicle, typically the left handlebar that includes a button on the interface that can be in one of three positions, a shift-up, neutral, or shift-down position. U.S. Pat. No. 6,257,081 describes such an interface and is incorporated herein by reference. Because the shift-up and shift-down buttons are located on the same interface, the rider may accidentally push the button in the wrong direction or, if separate buttons are provided, may push the wrong button which can cause an unpleasant surprise to the rider who was expecting to shift in an opposite direction. Depressing the button in the correct direction, or if separate buttons are provided, the correct button, also becomes more difficult if the rider is wearing gloves. In addition, for the rider to have confidence in what button is being pushed, the rider needs to look down at the interface located on the handlebar and thus divert his or her attention from driving.

Thus, it is desirable to provide a rider interface for electronic or mechanical shifting that is easy for the rider to use even while the rider is wearing gloves to reduce the possibility of rider error in selecting the appropriate control. In addition, it is desirable to provide a rider interface for electronic or mechanical shifting that does not divert the rider's attention and is intuitive for the rider to use.

SUMMARY OF THE INVENTION

According to a first aspect of the invention, there is provided a system for shifting gears or changing CVT ratio on an ATV. The system includes a first shifting control and a second shifting control. The first shifting control is located on a left handlebar of the ATV and the second shifting control is located on a right handlebar. A brake control is located on the left handlebar and an accelerator is located on the right handlebar.

According to a second aspect of the invention, there is provided a system for electronically shifting gears or changing CVT ratio on an ATV. The system includes an up-shift control located on a first side of an ATV and a down-shift control located remotely from the up-shift control on a second side of the ATV.

According to a third aspect of the invention, there is provided a system for shifting gears or changing CVT ratio on an ATV. The system includes a means for up-shifting located on a left handlebar of the ATV and a means for down-shifting located on a right handlebar of the ATV.

According to a fourth aspect of the invention, there is provided a system for shifting gears or changing CVT ratio on an ATV. The system includes an ATV chassis, a first shifting control, and a second shifting control. The ATV chassis is divided into a first side and a second side by a centerline. The first shifting control is located on the first side of the ATV and the second shifting control is also located on the first side of the ATV but remotely located from the first shifting control so that the second shifting control is separated from the first shifting control such that one finger is used to operate one button and a different finger is used to operate the second control.

DETAILED DESCRIPTION OF THE PREFERRED EMBODIMENTS OF THE PRESENT INVENTION

The following detailed description should be read with reference to the drawings, in which like elements in different drawings are numbered identically. The drawings depict selected embodiments and are not intended to limit the scope of the invention. It will be understood that embodiments shown in drawings and described above are merely for illustrative purposes, and are not intended to limit scope of the invention as defined in the claims that follow.

Figure 1:
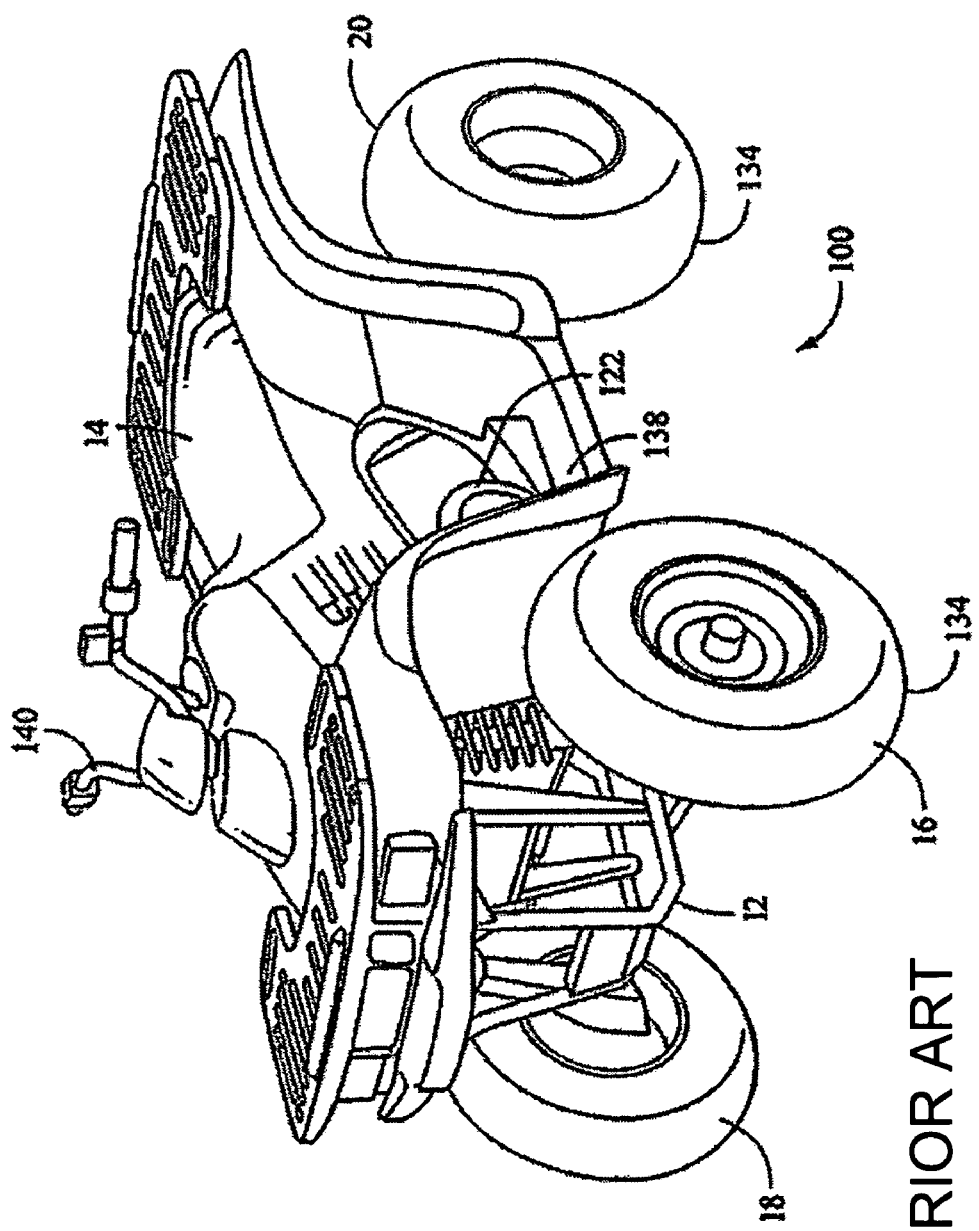
FIG. 1 is a perspective view of an ATV.

FIG. 1 is a perspective view of an ATV 100. The ATV 100 includes a chassis 12 carrying a straddle type seat 14. The seat 14 is sufficiently narrow to be straddled by a vehicle rider. The ATV 100 has a left front wheel 16, a right front wheel 18, a left rear wheel 20 and a right rear wheel (not visible in FIG. 1). Of course, it will be appreciated that the vehicle may have more than two rear wheels, for example, it may have six or more. The ATV 100 also includes an engine 122 that is carried by the chassis 12. The engine 122 is preferably coupled to at least some wheels of the ATV 100 via a drive train for propelling the ATV 100. The engine 122 may be used to power each rear wheel 20, and in some cases, also each front wheel 16, 18. The ATV 100 also includes a left and right foot rest 138 extending from each side of the chassis 12, of which only the left foot rest can be seen in FIG. 1. The ATV 100 also includes a left and right handle bar member 140 that is coupled to the front wheels 16, 18 and used to steer the ATV 100.

Figure 2:
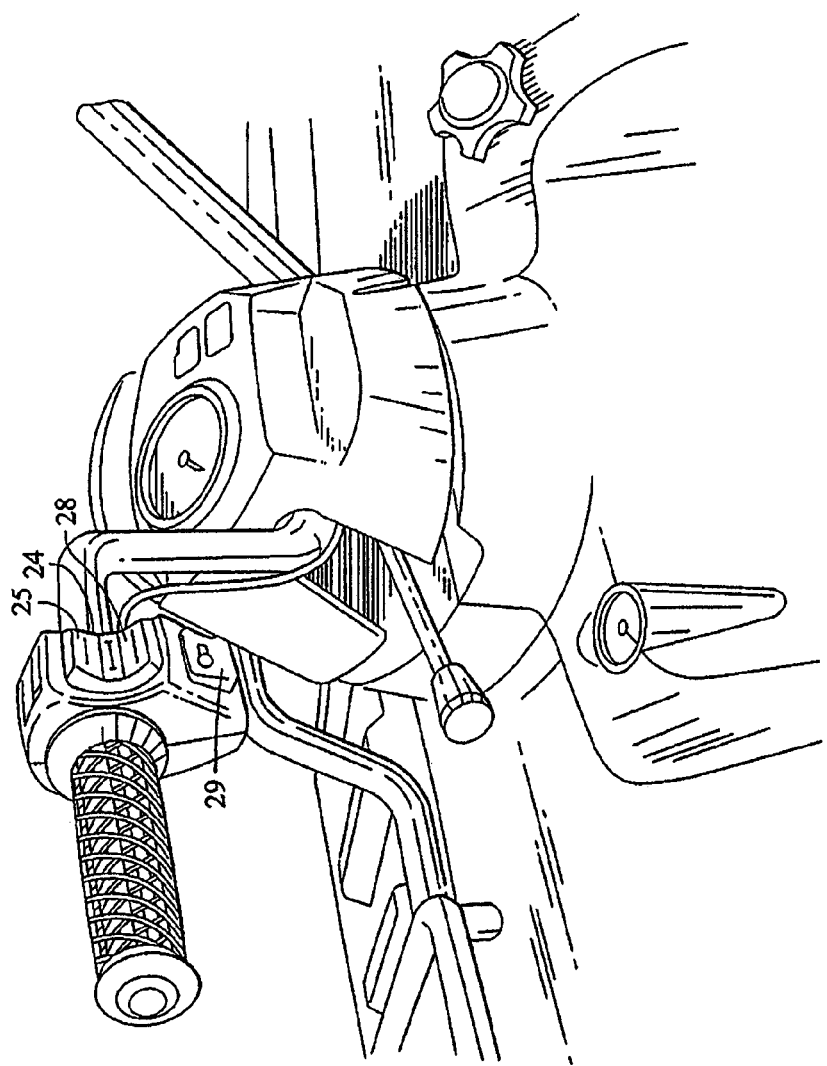
FIG. 2 is an elevation view of an automated shift device according to the prior art.

FIG. 2 is an elevation view of an automated shift device according to the prior art. As previously described, the shift device 24 is an interface located on the left handlebar of an ATV. A shift device 24 includes an up-shift momentary contact button switch 25 and a downshift momentary contact button switch 28 of the type in which an electrical circuit is closed when either the button 26 or 28 is depressed and opened when the buttons are not depressed. Each of the buttons 26 and 28 has a power source lead wire (not shown) electrically attached thereto and connected to a power source (not shown), and each of the switches has a solenoid or an Electronic Control Unit (ECU) connecting lead wire (not shown). The shift device 24 may also have an operating-mode button 29 which permits an operator to select between an automated transmission mode and a fully automatic transmission mode. As mentioned in the background, locating the up-shift and down-shift controls on the same rider interface, has its associated disadvantages.

Figure 3:
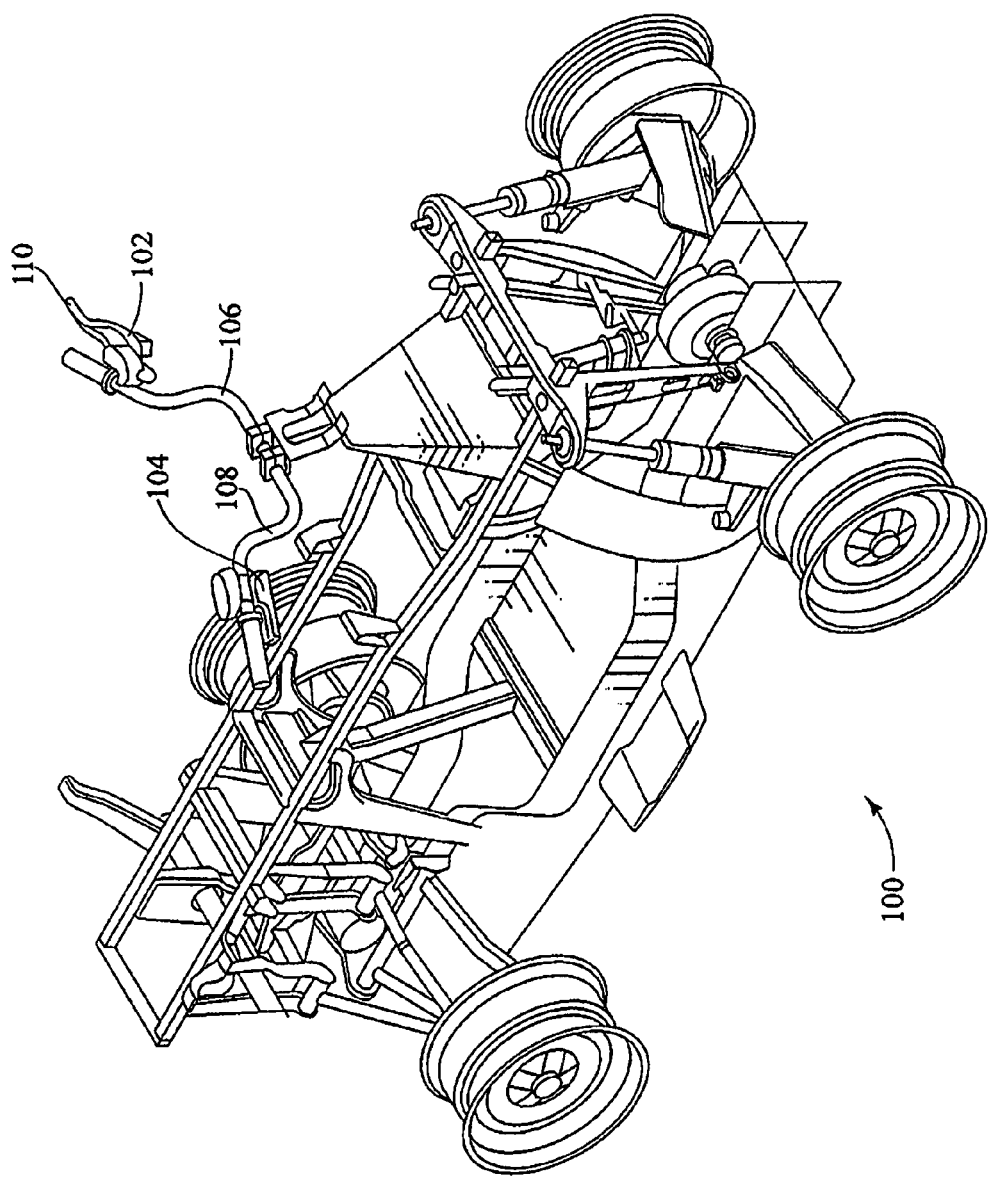
FIG. 3 is a perspective view of an ATV frame having rider interfaces according to a preferred embodiment of the present invention.

FIG. 3 is a perspective view of an ATV frame 100 having rider interfaces according to a preferred embodiment of the present invention. Not all of the components of the ATV are illustrated in order to simplify the figure. In a preferred embodiment, the up-shift control 102 and the down-shift control 104 have been separated so that they are remotely located from one another. In a preferred embodiment, one control is located on a left handlebar 106 of the ATV and the other is located on a right handlebar 108. In a preferred embodiment, the up-shift control 102 is a paddle lever located on the left handlebar 106 of the ATV and the down-shift control 104 is a trigger lever located on the right handlebar 108 of the ATV. In a preferred embodiment, the paddle lever 102 is located under the left handlebar 106 (as will be seen in better detail in FIG. 5) so that it can be operated by the operator's left thumb pushing the paddle lever 102 toward the front wheels of the ATV and the trigger lever 104 is located in front of the right handlebar 108 so that it can be operated by the operator's fingers on the right hand pulling the lever away from the front wheels of the ATV. It will be appreciated that these positions may be reversed.

The separation of the up-shift control 102 and the down-shift control 104 provides that each hand of the operator of the vehicle is assigned a separate shifting task. This design is more intuitive for the rider because the rider's right hand either accelerates while the left hand up-shifts or the rider's right hand down-shifts while their left hand brakes. Thus, the same hand is not controlling both the up-shift and down-shift control. It is possible for the right hand to down-shift and accelerate at the same time. It is also possible for the left hand to up-shift and brake at the same time.

In addition, the locations of the up-shift control an the down-shift control may be adjusted by the operator of the vehicle to fit the operator's preferences.

Figure 4:
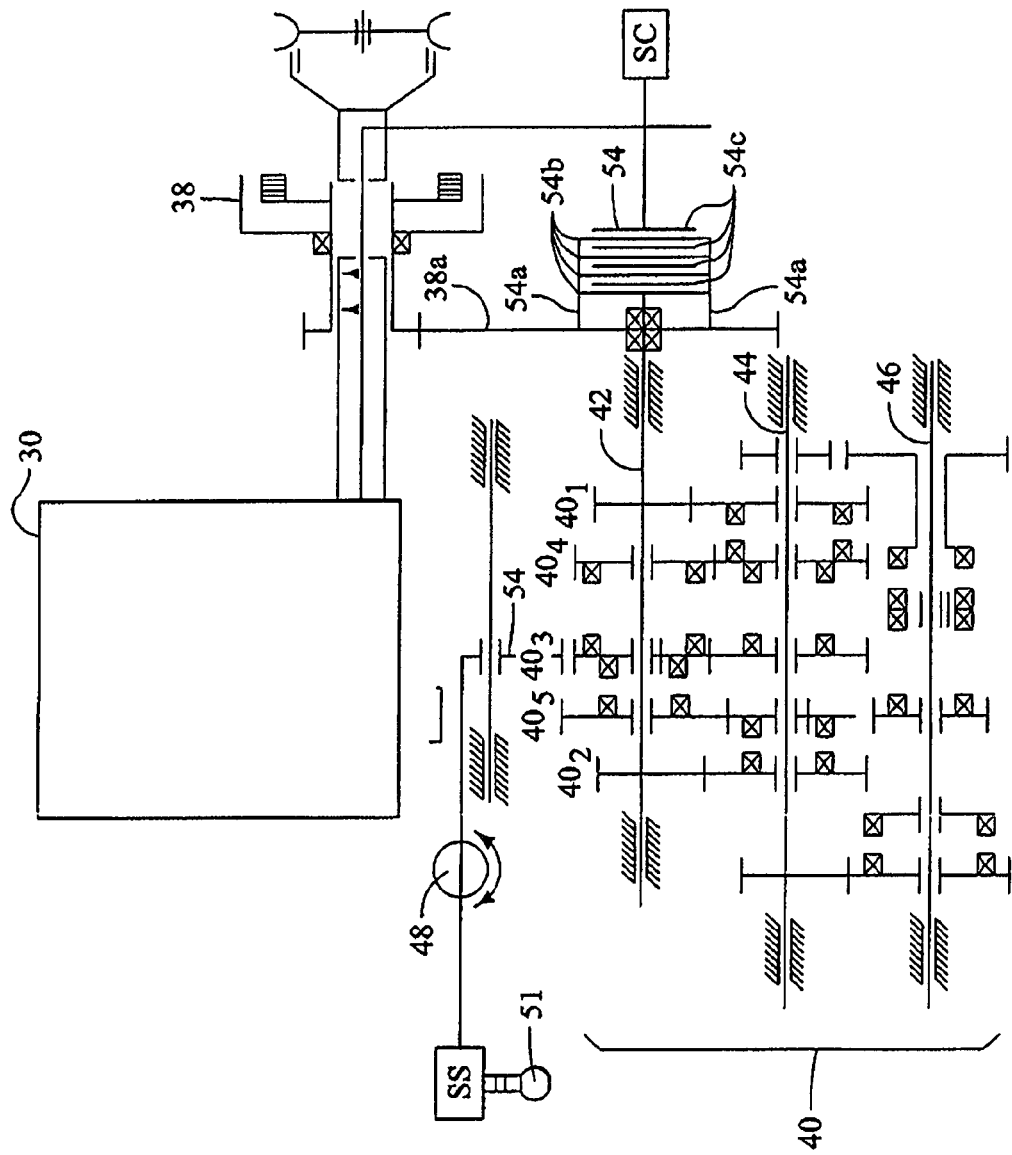
FIG. 4 is a diagrammatic view of a portion of an engine and transmission with which the embodiments of the present invention may be used.

FIG. 4 is a diagrammatic view of a portion of an engine and transmission with which the embodiments of the present invention may be used. In this preferred embodiment the up-shift and down-shift controls interface electrically with the transmission as is well known to those of ordinary skill in the art. Alternately, the up-shift and down-shift controls may be coupled to cables to manually shift the gears of a manual transmission without electronics. In addition, the transmission may be hydraulic and the up-shift and down-shift buttons may control valves. Various ways of coupling the up-shift and down-shift controls to the transmission is well known to those of ordinary skill in the art and need not be described in further detail.

The transmission system includes an engine 30, a crankshaft 36 driven by pistons (not shown) in the engine, a starting clutch 38 mounted on a front end of the crankshaft 36, and transmission 40 integrated with the engine 30.

The transmission 40 may have a main shaft 42, a secondary shaft 44 and an output shaft 46. A shift drum 48 is connected to shift forks 52. Shift forks 52 are operated for changing the gear ratio of the transmission 40. The transmission 40 thus includes a first speed gear train $40_1$, a second speed gear train $40_2$, a third speed gear train $40_3$, a fourth speed gear train $40_4$ and a fifth speed gear train $40_5$. A multiple disk transmission clutch 54 is mounted on one end of the main shaft 42.

The operation of the engine and transmission will now be described. The engine 30 must have a certain minimum speed before it can run on its own power and develop a sufficiently high torque to drive the straddle type vehicle 8. Thus, to prevent power from being transmitted from the crankshaft 36 to the transmission clutch 54 at low rotating speeds, the centrifugal clutch 38 remains disengaged and when the operator sufficiently increases the speed of the engine 30, the centrifugal clutch 38 is engaged automatically. As the rotational speed of the crankshaft 36 increases, the output torque of the crankshaft 36 is transmitted through the centrifugal clutch 38 and the transmission clutch 54 to the main shaft 42.

The clutch 54 is coupled with a gear 38a in a conventional manner. For example, the gear 38a is mounted on the main shaft 42 using bearings or bushings, such that the gear 38a can rotate relative to the main shaft 42. The gear 38a is connected to a clutch wall 54a that rotates with the gear 38a and at least one of a plurality of plates 54b of the clutch 54. At least one of a plurality of plates 54c of the clutch 54 is fixedly coupled to the main shaft 42. The clutch valve causes coupling of the plates 54b and 54c. Rotational movement is transferred from the clutch 38 to the gear 38a, clutch wall 54a and at least one of the plates 54b. Coupling of plates 54b and 54c controls rotation of main shaft 42. The torque of the main shaft 42 is transmitted through the first speed gear $40_1$ and the secondary shaft 44 to the output shaft 46 to drive the output shaft 46.

Once the operator activates the up-shift control 102, an input is generated and the clutch is activated which disengages the transmission to permit smooth shifting. At the same time, after an activating delay, a Solenoid-Shift (SS) is also activated which operates the shift drum 48 connected to the shift forks 52 to move the shift forks 52 in order to engage the second speed gear $40_2$. Obviously, the shifting occurs while the clutch 54 is disengaged. Once the shift is complete, the SS has a return spring 51 for returning it to a neutral position.

Shifting from second speed gear $40_2$ to third speed gear $40_3$; from third speed gear $40_3$ to fourth speed gear $40_4$; and from fourth speed gear $40_4$ to fifth speed gear $40_5$ operates in the same manner as that described above. Downshifting from n speed gear to n−1 speed gear also operates in the same manner except that an input is generated when the operator activates the down-shift control 104.

While the preferred embodiment has been described with a transmission having discrete gears, the embodiments of the invention may also be used with continuously variable transmissions (CVTs such as that described in U.S. Pat. No. 6,149,540, which is hereby incorporated in its entirety by reference) to change the CVTs ratio.

Figure 5:
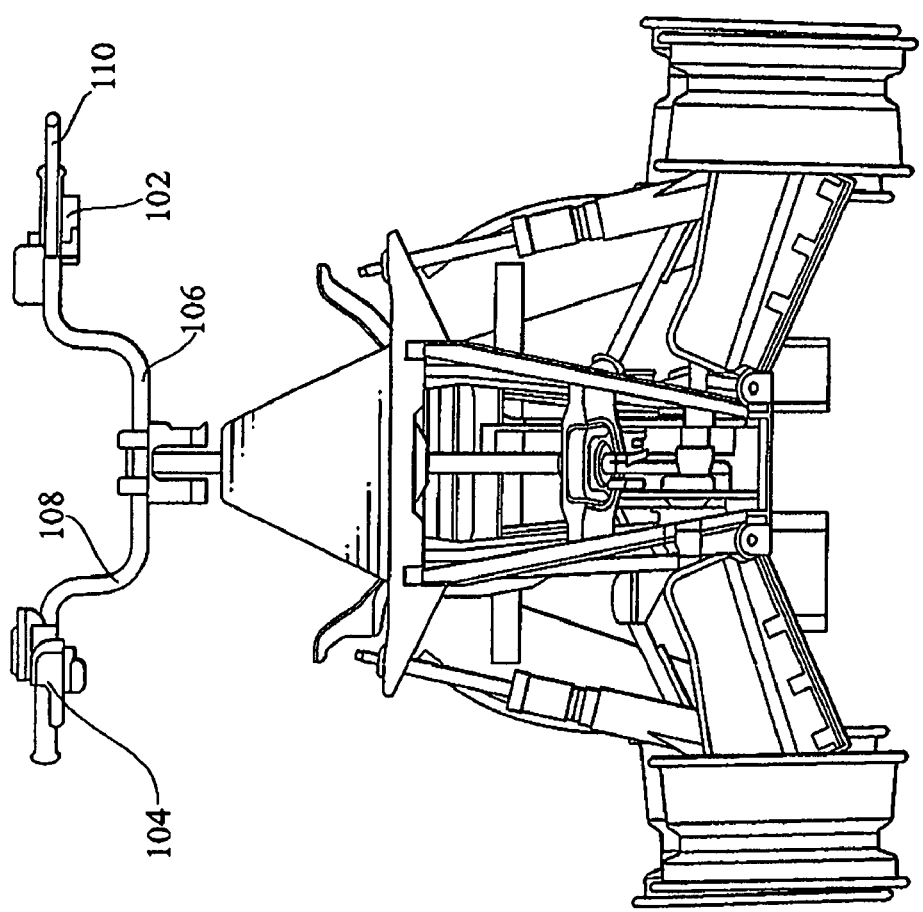
FIG. 5 is a front elevational view of the ATV shown in FIG. 3.

FIG. 5 is a front elevational view of the ATV shown in FIG. 3. As previously described, the paddle lever 102 that forms the up-shift control is located under the left handlebar 106 and to activate it, the driver pushes it away from himself/herself. The trigger lever 104 that forms the down-shift control is located in front of the right handlebar 108 and to activate it, the driver pulls the lever towards himself/herself. It will be appreciated that the location of the up-shift and down-shift controls can be reversed and that the up-shift control can be a trigger lever and the down-shift control can be a paddle lever.

The ATV also preferably has a brake control 110 located on the left handlebar and an accelerator control in the form of a throttle (not shown) located on the right handlebar. Thus, while the rider is up-shifting with their left hand, they are accelerating with their right hand and when they are down-shifting with their right hand, they are braking with their left hand. During acceleration, the rider's thumbs on each hand are employed and, during braking, the rider's fingers on each hand are employed.

It will be appreciated that the paddle/trigger levers combination is easier for a rider to operate than push buttons especially if the rider is wearing gloves. In addition, because of the separation of the controls and their placement, the rider does not need to divert his or her attention in order to activate the shifting controls.

Figure 6:
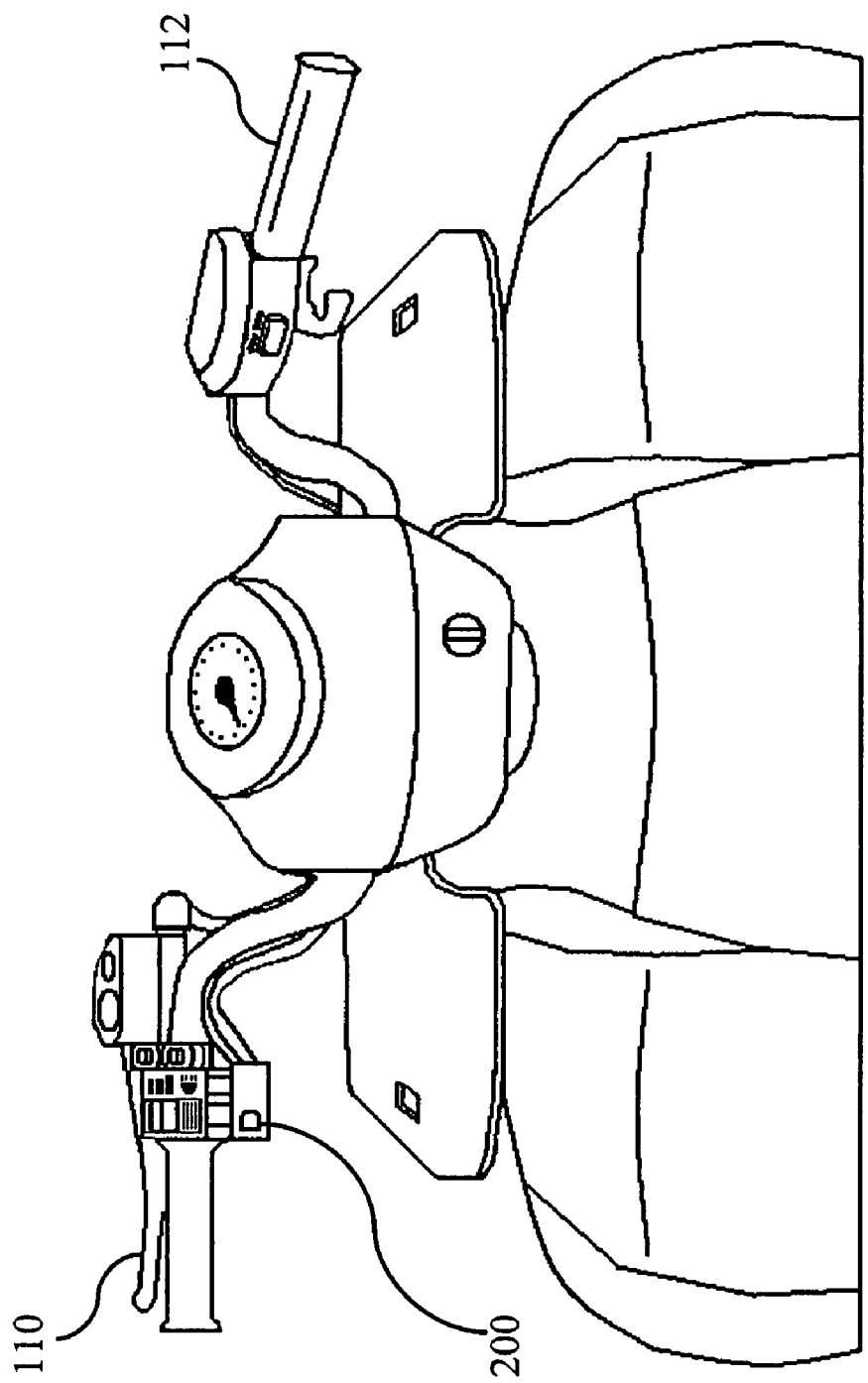
FIG. 6 is an elevational view of a reverse override control provided on the ATV shown in FIG. 3.

FIG. 6 is an elevational view of a reverse override control that may also be provided on a handlebar of the ATV shown in FIG. 3. A reverse override control preferably is in the form of a button 200 located on the left handlebar. When shifting into reverse, the rider depresses the reverse override button 200 with the rider's left thumb while downshifting with their right hand.

An automatic shift mode button such as the one disclosed in U.S. Pat. No. 6,257,081 could be added to the ATV if the ATV is equipped with a continuously variable transmission (CVT) or fully automatic transmission to allow the operator to switch from semi-automatic operation to automatic operation and vice versa. An automatic mode indicator light could be added so that a quick glance will allow the operator to know if the automatic mode has been activated. Preferably activating either of the shift controls will switch the vehicle's operation from automatic to manual mode. When the ATV is in the manual mode, the automatic switch mode button could be backlit and raised so that it would be easy to identify and easy to depress. Once it is depressed, it will no longer be backlit and the automatic mode indicator light will be lit. The automatic shift mode button remains depressed until either one of the shift controls is activated and the ATV switches back to manual mode.

Instead of locating the up-shift and down-shift controls on the handlebars, they may be mounted in the foot wells of the ATV so that the up-shift or down-shift control may be activated with the left or right foot of the operator. The up-shift control may be located on either the right or left side of the ATV as long as the down-shift control is located on the opposite side of the ATV from the up-shift control.

In addition, in another embodiment the up-shift and down-shift controls may be located on the same handlebar but separated from one another so that they are operated with different fingers. For example, the up-shift control may be provided on the left handlebar as a push paddle for the operator's left thumb and the down-shift control is also provided on the left handlebar, separated from the up-shift control, as a squeeze trigger for the operator's left fingers, assuming the brake is located on the right handlebar. In this preferred embodiment the up-shift control and down-shift control are separated by a distance ranging from about 1.0 inches to about 5.0 inches. Of course if the brake is located on the left handlebar, the up and down-shift controls are located on the right handlebar.

In another preferred embodiment, the location of the up-shift and down-shift controls can be adjusted to accommodate a rider's preferences. This could be accomplished, for example, by providing a means for the buttons to be rotated on the handlebar or translated along the handlebar.

The above specification provides a complete description of the manufacture and use of the invention. Since many embodiments of the invention can be made without departing from the spirit and scope of the invention, the invention reside in the claims hereinafter appended.

What is claimed is:

1. A system for shifting gears or changing CVT ratio on an ATV, the system comprising:
    a chassis;
    a pair of front wheels supporting the chassis;
    a pair of rear wheels supporting the chassis;
    left and right handlebars operably coupled to the front wheels to steer the ATV;
    an engine operably coupled to at least one of the wheels;
    a transmission operably coupled to the engine;
    a first shifting control located on the left handlebar of the ATV and configured to control the transmission;
    a second shifting control located on the right handlebar of the ATV and configured to control the transmission;
    a brake control located on the ATV; and
    an accelerator located on the ATV.

2. The system according to claim 1 wherein the first shifting control is an up-shift and the second shifting control is a down-shift.

3. The system according to claim 2 wherein a rider is up-shifting with their left hand while they are accelerating with their right hand and the rider is downshifting with their right hand while they are braking with their left hand.

4. The system according to claim 1 wherein the first shifting control is a paddle lever operable by the rider's thumb pushing the paddle lever toward the front wheels.

5. The system according to claim 1 wherein the second shifting control is a trigger lever operable by the rider's fingers pulling the trigger lever away from the front wheels.

6. The system according to claim 1 wherein the first shifting control is a paddle lever operable by the rider's thumb and the second shifting control is a trigger lever operable by the rider's fingers.

7. The system according to claim 1 wherein the left handlebar is provided with a left handlebar grip and the first shifting control is located below the left handlebar grip.

8. The system according to claim 1 wherein the right handlebar is provided with a right handlebar grip and the second shifting control is located in front of the right handlebar grip.

9. The system according to claim 1 wherein the left handlebar is provided with a left handlebar grip and the first shifting control is located below the left handlebar grip and wherein the right handlebar is provided with a right handlebar grip and the second shifting control is located in front of the right handlebar grip.

10. The system according to claim 1 wherein the accelerator is a throttle.

11. A system for shifting gears or changing CVT ratio on an ATV, the system comprising:
    an up-shift control located on a first side of the ATV; and
    a down-shift control located remotely from the up-shift control on a second side of the ATV.

12. The system according to claim 11 wherein the up-shift control is a paddle lever operable by the rider's thumb pushing the paddle lever toward a front of the ATV.

13. The system according to claim 11 wherein the down-shift control is a trigger lever operable by the rider's fingers pulling the trigger lever away from a front of the ATV.

14. The system according to claim 11 wherein the up-shift control is a paddle lever operable by the rider's thumb pushing the paddle lever toward a front of the ATV, and the down-shift control is a trigger lever operable by the rider's fingers pulling the trigger lever away from a front of the ATV.

15. The system according to claim 11 wherein the up-shift control is located on a left handlebar of the ATV and the down-shift control is located on a right handlebar of the ATV.

16. The system according to claim 15 wherein the left handlebar is provided with a left handlebar grip and the up-shift control is located below the left handlebar grip.

17. The system according to claim 15 wherein the right handlebar is provided with a right handlebar grip and the down-shift control is located in front of the right handlebar grip.

18. The system according to claim 15 wherein the left handlebar is provided with a left handlebar grip and the up-shift control is located below the left handlebar grip and wherein the right handlebar is provided with a right handlebar grip and the down-shift control is located in front of the right handlebar grip.

19. A system for shifting gears or changing CVT ratio on an ATV, the system comprising:
means for up-shifting located on a left handlebar of the ATV; and
means for down-shifting located on a right handlebar of the ATV.

20. The system according to claim 19 wherein the means for up-shifting is a paddle lever operable by a rider's thumb pushing the paddle lever toward a front of the ATV, and the means for down-shifting is a trigger lever operable by a rider's fingers pulling the trigger lever away from a front of the ATV.

21. The system according to claim 1 wherein the brake control is located on the left handlebar of the ATV and the accelerator is located on the right handlebar of the ATV.

22. The system according to claim 1 wherein the brake control is located on the right handlebar of the ATV and the accelerator is located on the left handlebar of the ATV.

23. The system according to claim 1 wherein the first shifting control is located in front of the left handlebar and the second shifting control is located below the right handlebar.

24. The system according to claim 1 wherein the first shifting control is located below the left handlebar and the second shifting control is located in front of the right handlebar.

25. The system according to claim 1 wherein the locations of the first and second shifting controls are adjustable by the operator of the vehicle to fit the operator's preferences.

26. The system according to claim 11 wherein the up-shift control is located near the operator's left foot when the operator is mounted on the ATV so that it can be activated with the operator's left foot and the down-shift control is located near the operator's right foot when the operator is mounted on the ATV so that it can be activated with the operator's right foot.

27. The system according to claim 11 wherein the up-shift control is located near the operator's right foot when the operator is mounted on the vehicle so that it can be activated with the operator's right foot and the down-shift control is located near the operator's left foot when the operator is mounted on the vehicle so that it can be activated with the operator's left foot.

28. The system according to claim 1 wherein the first and second shifting controls are mechanical.

29. The system according to claim 1 wherein the first and second shifting controls are electrical.

30. The system according to claim 1 wherein the first and second shifting controls are operably coupled to hydraulic control valves.

* * * * *

UNITED STATES PATENT AND TRADEMARK OFFICE
CERTIFICATE OF CORRECTION

PATENT NO. : 7,367,420 B1 Page 1 of 1
APPLICATION NO. : 11/010736
DATED : May 6, 2008
INVENTOR(S) : Sean Sherrod and Matt Tandrup It is certified that error appears in the above-identified patent and that said Letters Patent is hereby corrected as shown below:

TITLE PAGE, Item (75), Inventors

Delete the word "Iandrup" and insert the following in place thereof:

--Tandrup--.

Signed and Sealed this

Twenty-third Day of September, 2008

JON W. DUDAS
*Director of the United States Patent and Trademark Office*